United States Patent [19]

Gerber

[11] Patent Number: 4,994,505
[45] Date of Patent: Feb. 19, 1991

[54] BINDER COMPOSITIONS COMPRISING LOW MOLECULAR WEIGHT POLY(ORTHOMETHYLOLATED) PHENOLIC COMPOUND AND NOVOLAC RESIN

[75] Inventor: Arthur H. Gerber, Louisville, Ky.

[73] Assignee: Borden, Inc., Columbus, Ohio

[21] Appl. No.: 271,447

[22] Filed: Nov. 15, 1988

[51] Int. Cl.$^5$ .................... B22C 1/22; C08L 61/00
[52] U.S. Cl. .................... 523/145; 524/541; 525/501
[58] Field of Search .................... 523/145; 525/501; 524/541

[56] References Cited

U.S. PATENT DOCUMENTS

| | | | |
|---|---|---|---|
| Re. 32,319 | 12/1986 | Korb et al. | 423/445 |
| Re. 32,720 | 7/1988 | Lemon et al. | 523/145 |
| Re. 32,812 | 12/1988 | Lemon et al. | 523/145 |
| 2,985,614 | 5/1961 | Bright . | |
| 3,639,658 | 12/1971 | Soldatos . | |
| 3,644,269 | 2/1972 | Hoyt et al. | 164/34 |
| 3,879,338 | 4/1975 | Grazen et al. . | |
| 4,148,777 | 4/1979 | LaBar et al. | 164/43 |
| 4,313,973 | 2/1982 | McMurtry et al. | 427/205 |
| 4,357,457 | 11/1982 | Harris | 528/159 |
| 4,391,929 | 7/1983 | Harris | 528/218 |
| 4,426,467 | 1/1984 | Quist et al. | 523/145 |
| 4,468,359 | 8/1984 | Lemon et al. | 523/145 |
| 4,474,904 | 8/1986 | Lemon et al. | 523/146 |
| 4,607,067 | 8/1986 | Ohashi et al. | 164/526 |
| 4,626,569 | 12/1986 | Waitkus et al. | 524/541 |
| 4,644,022 | 2/1987 | Iyer | 523/144 |
| 4,657,950 | 4/1987 | Iyer et al. | 523/145 |
| 4,775,455 | 10/1988 | Chandrammouli et al. | 524/59 |

FOREIGN PATENT DOCUMENTS

| | | |
|---|---|---|
| 0270377A2 | 6/1988 | European Pat. Off. |
| 1065065 | 9/1959 | Fed. Rep. of Germany |
| 1171606 | 6/1964 | Fed. Rep. of Germany |
| 53-75294 | 7/1978 | Japan |
| 086986 | 2/1984 | Japan |
| 60-180904 | 10/1985 | Japan |
| 62-28041 | 2/1987 | Japan |
| 62-28043 | 2/1987 | Japan |
| 62-282743 | 12/1987 | Japan |
| 63-40636 | 2/1988 | Japan |
| 1553112 | 9/1979 | United Kingdom |
| 2140017A | 11/1984 | United Kingdom |
| 1094590 | 12/1987 | United Kingdom |

OTHER PUBLICATIONS

Jones, "The Condensation of Trimethylolphenol", Journal of Polymer Science: Polymer Chemistry Edition, vol. 21, 1801–1817, (1983).

Casiraghi et al., "Selective Step-Growth Phenol-Aldehyde Polymerization, Synthesis, Characterization, and X-Ray Analysis of Regular All-Ortho Ethylidene-Linked Oligonuclear Phenolic Compounds", Macromolecules, vol. 17, No. 1, pp. 19–28 (1984).

Sandler, *Polymer Syntheses*, Academic Press, Vol. II, pp. 61–62, 71 (1977).

Martin, "Sodium Poly(Hydroxymethyl)-Phenates", Contributed from New Product Development Laboratory, General Electric Company, 2/24/89.

*Primary Examiner*—Lewis T. Jacobs
*Attorney, Agent, or Firm*—Dennis H. Rainear; Kenneth P. Van Wyck

[57] ABSTRACT

The invention relates to a binder composition comprising a low molecular weight poly (orthomethylolated) phenolic compound which is combined with a phenol formaldehyde novolac resin and cured in the presence of alkali and an organic ester. Low and high density aggregates can be added to the binder to produce foundry or refractory articles. The binder can also be applied, with or without aggregate, to paper, fabrics, or concrete.

29 Claims, No Drawings

BINDER COMPOSITIONS COMPRISING LOW MOLECULAR WEIGHT POLY(ORTHOMETHYLOLATED) PHENOLIC COMPOUND AND NOVOLAC RESIN

BACKGROUND OF THE INVENTION

This invention pertains to a new binder composition suitable for use in bonding a particulate material such as sand or other refractory or foundry material.

It is known in the art to employ phenol-formaldehyde resole resins to bond granular refractory material, e.g., in a foundry molding composition. For example, Quist, et al. U.S. Pat. No. 4,426,467 discloses such a composition which is curable at room temperature using a lactone as curing agent.

While such compositions are extremely desirable inasmuch as they are curable at ambient temperature, such resins may have unacceptable thermal properties, i.e., they may experience veining and tearing at high temperatures experienced when subjected to molten metal in the foundry. Such resins are also especially deficient for use in preparing refractory articles, which, in addition to being able to withstand extremely high temperatures (e.g., for use in furnaces), must optimally contribute carbon when sintered.

To obviate problems of thermal insufficiency and insufficient provision of residual carbon, phenolic novolac resins may be tried. However, novolac resins are often undesirable inasmuch as they (1) require heat to cure, (2) evolve noxious formaldehyde fumes, (3) possess practically no "green strength," or room temperature cure, and (4) exhibit high solution viscosities due to the high molecular weight of the novolac.

It is also known to use a phenol-formaldehyde novolac resin to bond a carbonaceous aggregate, such as is disclosed in Chandramouli, et al., U.S. Pat. No. 4,775,455 issued Oct. 4, 1988, and Chandramouli, et al., U.S. Ser. No. 210,726 filed June 23, 1988 (both assigned to the assignee of the present invention). In a preferred teaching in the former, a blend of novolac and resole resins may be employed, but requires thermal curing, or high acid levels.

Harris U.S. Pat. No. 4,357,45, issued Nov. 2, 1982 teaches the use of the tetramethylol derivative of 4,4' iso-propylidenediphenol, water and ethylene carbonate or propylene carbonate to produce a resin solution useful for binding fillers. Harris, however, does not utilize an alkaline cure and, in fact, in the Examples uses acid catalysis to cure the resins.

Japanese Laid Open Pat. Application Ser. No. 62-282743 (Dainippon Ink) teaches a phenol-formaldehyde resin binder in which the phenol-formaldehyde resin's average molecular weight is 300 –1,500, preferably 500 –1,100. The Dainippon Ink application teaches that the molecular weight should be as high as possible, and utilizes polymeric resole resins, not methylolated monomeric phenolic compounds.

Japanese Laid Open Applications Ser. Nos. SHO 63-40636 and 60-180904 teach potassium alkali resole type bisphenolic resins in an aqueous solution, which when mixed with sand and hardened by an organic ester, provide high strength molds. The potassium alkali resole type bisphenolic resin used in SHO 63-40636 and SHO 60-180904 is obtained by reacting formaldehyde with a previously methylolated bisphenol compound. SHO 60-180904 and SHO 63-40636 do not teach the use of a low molecular weight methylolated phenolic compound to crosslink a novolac resin, and 60-180904 requires a relatively high molar ratio of alkali/bisphenol of 1.2:1 to 2.4:1.

SUMMARY OF THE INVENTION

Accordingly, the present invention provides a composition useful as a binder which overcomes the defects of the prior art, cures at room temperature, and provides a high strength bonding of various aggregates and substrates in relation to commercially available systems.

The present invention relates to the utilization of low molecular weight poly(orthomethylolated) phenolic compounds which are reacted with phenol-formaldehyde novolac resin to produce a mixture which, in the presence of an alkali and an organic ester, forms a curable binder. The binder can also include a particulate aggregate, water, and other additives.

According to the present invention, low molecular weight poly(orthomethylolated) phenolic compounds such as 2,6-dimethylol p-cresol (hereinafter DMPC); 2,2',6,6'-tetramethylol bisphenol A, (hereinafter TMBPA); or 2,4,6-trimethylol phenol (hereinafter TMP) can be mixed with novolac resin and aqueous alkali to form a curable binder using an organic ester as curing agent. Also operative as low molecular weight poly(orthomethylolated) phenolic compounds in the present invention are 2,6-dimethylol phenol (DMP) derivatives and TMP derivatives, such as 2,6-dimethylol 4-t-butylphenol.

DMPC is available from PMC Specialties Group, Cincinnati, Ohio. TMBPA is described in U.S. Pat. No. 4,357,457. The sodium and lithium salts of TMP are described by R. W. Martin, J.Am.Chem.Soc., 73, 3952(1951); J. H. Freeman, Am.Chem.Soc., Div.Org-.Coat.Plast.Chem., Pap. 27, 94(1967).

Monomethylolated phenolic compounds, when mixed with novolac resin, aqueous alkali and a curing agent, generally provide unsatisfactory room temperature cured strength and much lower post oven cured strength than do polymethylolated phenolic compounds. Such monomethylolated phenolic compounds include, for example, o-hydroxybenzyl alcohol (also called saligenin, salicyl alcohol, or o-HBA) and p-hydroxybenzyl alcohol (p-HBA).

In one aspect of the invention, a composition for use in making a shaped article, e.g., a foundry mold or core or a refractory article, is provided. The composition comprises a mixture of (a) an aggregate material; (b) a curable resin binder in sufficient quantity to bond the aggregate into a desired shape; and (c) an ester-functional curing agent in an amount sufficient to effect curing of the binder, the binder (b) comprising (i) a phenol formaldehyde novolac resin having a formaldehyde:phenol mole ratio in the range of about 0.5:1 to about 1:1, and (ii) a low molecular weight poly(orthomethylolated) phenolic compound, wherein the novolac resin (i) and the poly(orthomethylolated) phenolic compound (ii) are present in a weight ratio of between about 5:1 and 0.35:1, based on novolac resin solids, and wherein the ester-functional curing agent (c) is selected from the group consisting of lactones, cyclic organic carbonates, carboxylic acid esters, and mixtures thereof. The resin binder may be present in the composition at a level of about 1% to about 15%, based on the weight of the aggregate, and the curing agent may be present at a level of about 3% to about 25% based on the weight of the phenolic compound in the resin binder.

The compositions of the present invention are also useful as binders for coatings applied to rigid surfaces, such as concrete, or for impregnating paper, fibers, or woven materials or fabrics.

By "low molecular weight poly(orthomethylolated) phenolic compound" herein is meant a compound of molecular weight from about 154 to about 320 containing one or two phenyl rings substituted with 2 to 4 methylol groups, —CH$_2$OH, at least two of which are ortho to a hydroxyl group on an aromatic ring.

The definition of "low molecular weight poly(orthomethylolated) phenolic compound" herein is also meant to include reaction products and side reaction products of the reaction between formaldehyde or paraformaldehyde and a hydroxylated aromatic compound, said reaction products and side reaction products including, but not being limited to, a pentamethylolated product; a condensation reaction product wherein two hydroxyl groups on aromatic rings or two methylol groups or one aromatic hydroxyl group and one methylol group condense to eliminate a water molecule and form an oxygen linkage; an etherification reaction product obtained by the reaction of a formaldehyde molecule and the methylol group of a methylolated aromatic ring. The aforedescribed reaction products and side reaction products are understood to include paramethylolated phenolic compound in addition to the poly(orthomethylolated) phenolic compound. Preferred reaction products useful herein as low molecular weight poly(orthomethylolated) phenolic compounds are those prepared by reacting one mole of a phenol with a source of 2.7–3.0 moles of formaldehyde at 45–70° C. in aqueous solution using potassium hydroxide as alkali (potassium ion:phenol mole ratio of 0.4:1.0) and using reaction times of, for example, 2 to 8 hours.

In another aspect of the present invention, a shaped article is provided comprising the composition described above.

In a further aspect, the invention relates to a process for making a refractory body that can be sintered to form a carbonized article. The carbon contributes to the dimensional stability of the articles via refractory bonding (i.e., through durable carbon-carbon bonds and carbon-aggregate bonds) and also provides abrasion resistance. The refractory body is prepared from the above-described binder and an aggregate material. For refractory applications, additional heat can be applied to carbonize the resin binder.

In still another aspect, the invention relates to a process for making foundry molds and cores from the aforedescribed composition comprising aggregate, resin binder and curing agent.

In yet another aspect the invention relates to a curable binder composition useful as a coating for porous substrates, such as paper or fabric, or non porous substrates, such as concrete.

DESCRIPTION OF THE PREFERRED EMBODIMENTS

This invention is, in one aspect, a composition comprising an aggregate material, a resin binder and a curing agent. The choices of the aggregate material, and of certain characteristics of the resin binder, are made according to the end product that is desired.

In one embodiment of the present invention, at least one poly(orthomethylolated) phenolic compound such as TMBPA or DMPC is combined with a novolac resin at 1:0.35 to 1:5 weight ratio and mixed with an ester-functional curing agent, such as triacetin, to produce a resin binder. The resin binder can be combined with a particulate aggregate material such as magnesia, sand, or alumina and is curable in the presence of alkali. The preferred weight ratio of resin binder to aggregate material is from about 1:99 to 15:85. The compositions of the present invention cure at room temperature in the presence of sufficient ester functional curing agent and alkali ion. The binder/aggregate mixture of the present invention cure at elevated temperatures in the presence or absence of an ester functional curing agent.

The aggregate material may be any material which may be bound with a resin binder, i.e., to form a shaped article such as a foundry mold or core, or a refractory article such as a refractory brick for furnace lining. The aggregate material may be in granular, powder, flake or fibrous form. Suitable aggregate materials for use in foundry applications include, but are not limited to, silica sand, quartz, chromite sand, zircon sand, olivine sand, and mixtures thereof. Suitable aggregate materials for use in refractory applications include, but are not limited to, magnesia, alumina, zirconia, silica, silicon carbide, silicon nitride, boron nitride, bauxite, chromite, corundum, and mixtures thereof.

It has now been found that, by employing a resin binder comprising a novolac resin, a poly(orthomethylolated) phenolic compound, with a molecular weight below about 318 and an ester-functional curing agent, a resin binder with a Gardner viscosity of 500 to 6000 centipoise at 25° C. may be formulated which is capable of providing adequate room temperature cure and high temperature strengths. The ester-functional curing agent is not required if the resin binder will be thermally cured by exposure to high temperatures, wherein room temperature "green strength" is not needed. The use of low molecular weight poly(orthomethylolated) phenolic compounds or derivatives thereof in the resin binders of the present invention provides compositions with lower solution viscosities for a given novolac at a given concentration relative to conventional polycondensed resole resins. The lower solution viscosity obtained by the present invention permits better wetting of the aggregate material and reduced mixing time. The resin binder provides, when thermally cured, the desirable properties of high carbonization and low thermal conductivity, resulting in the formation of carbon bonding for dimensional stability and abrasion resistance, and the ability to withstand extremely high temperatures, all of which make for a binder which is useful for refractory applications.

One of the constituents of the resin binder of the present invention is a novolac resin. A novolac resin may be defined as the generally acidic resinous reaction product of a phenol and an aldehyde that, for practical purposes, does not harden or convert to an insoluble, infusible condition upon heating but remains soluble in organic solvent or aqueous alkali and is thermally fusible. The resin may not be cured unless a curing agent such as hexamethylenetetramine ("hexa") is added. The formaldehyde:phenol mole ratio of the novolac resin useful in the present invention is in the range of about 0.5:1 to about 1:1, and preferably about 0.65:1 to about 0.85:1. Preferably, the novolac resin is prepared by combining a source of formaldehyde and a phenol at a pH of less than about 4, and more preferably about 2.

The phenol-formaldehyde novolac resin used in the present invention may be further combined with formaldehyde or with formaldehyde and phenol. The formaldehyde or formaldehyde and phenol which may be combined with the novolac resin may be excess from the preparation of the low molecular weight poly(orthomethylolated) phenolic compounds useful herein as the second constituent of the resin binder compositions.

The novolac resin may be used in the present invention in the form of, for example, a solution, flake, powder, or hot melt.

Novolac resins alone are not capable of ambient temperature ester-catalyzed cure. Therefore, use of hexa with novolac resin without heat provides inadequate "green strength" to an article at ambient temperature; heat must be applied to cure the hexa/novolac systems. Hexa and/or other methylene-generators, such as, for example, formaldehyde or paraformaldehyde, can be added to the resin binders of the present invention. When used, hexa is added at a level of about 3% to about 15%, based on the weight of total phenolic novolac, and more preferably at about 5% to 10%.

The second constituent of the resin binder of the present invention is a low molecular weight methylolated hydroxyphenyl or phenolic compound. It is preferred that the methylolated hydroxyphenyl compound have at least two methylol groups and that at least two of the methylol groups are in positions ortho to a hydroxyl group on an aromatic ring. All the methylol groups are not necessarily in positions ortho to the same hydroxyl group. The phenyl group can also have other substituents on the ring, such as, but not limited to, alkyl, alkaryl, alkoxy, aryl, and the like. Thus, orthomethylolated phenols, cresols, diphenols, bisphenols, dihydroxynaphthalenes (such as methylolated 1,5-; 1,6-; or 2,7-dihydroxynaphthalenes) and known alkyl, alkoxy, aryl and alkaryl derivatives thereof are all operative in the present invention, provided a minimum functionality of two methylol groups positioned ortho to a hydroxyl group are present. This amount of functionality on the methylolated phenolic compound is generally the minimum required to crosslink a sufficient number of reactive sites on the novolac resin used in the resin binder of the present invention to cure the resin binder.

Thus, the low molecular weight poly(orthomethylolated) phenolic compound can include, for example: bis-ortho(methylol 1,5-dihydroxynaphthalene); bis-ortho(methylol 1,6-dihydroxynaphthalene); bis-ortho(-methylol 2,7-dihydroxynaphthalene); 2,6-dimethylol phenol; 2,4,6-trimethylol phenol; 2,6-dimethylol-p-cresol; 2,6-dimethylol-p-tertiary butylphenol; 2,6-dimethylol-p-phenylphenol; 6,6'-dimethylol 2,2'-biphenol; 4,4',6,6'-tetramethylol 2,2'-biphenol; 2,2'-dimethylol 4,4'-biphenol; 2,2', 6,6'-tetramethylol 4,4'-methylene diphenol; 6,6'-dimethylol 2,2',-methylene diphenol; 4,6,6'-trimethylol 2,2'-methylene diphenol; 4,4', 6,6-tetramethylol 2,2'-methylene diphenol; 2,2'-dimethylol bisphenol A; 2,2', 6-trimethylol bisphenol A; 2,2', 6,6'-tetramethylol bisphenol A; and known alkyl, alkoxy, alkaryl, or aryl derivatives thereof, isomers thereof, and mixtures thereof.

The preferred weight ratio of poly(orthomethylolated) phenolic compound to novolac resin is from about 1:5 to about 1:2.0.

The resin binders of the compositions of the present invention are alkaline. The preferred alkalizing agents used to catalyze the crosslinking in the resin binders are compounds which provide alkali ions of potassium, sodium, calcium or lithium, such as potassium hydroxide, sodium hydroxide, calcium hydroxide, lithium hydroxide, calcium oxide, lithium oxide or mixtures thereof, the more preferred being potassium hydroxide. The alkaline oxides or hydroxides are generally present in an amount sufficient to produce a molar ratio of alkali, calculated as equivalents of potassium ion, to phenol in the composition in the range of about 0.1:1 to about 0.7:1.

The resin binders used in the compositions of the present invention may be prepared by mixing with solvent the prescribed proportions of novolac resin and methylolated phenolic compound. To achieve a more easily managed Gardner viscosity of, for example, less than 6,000 cps. at 25° C., a solvent for the resin binder may be used, wherein the preferred solvent for the resin binder is water but water-alcohol mixes also are acceptable. The solvent may also be selected from the group consisting of $C_1$–$C_7$ aliphatic and aromatic alcohols, $C_2$–$C_4$ glycols, and mixtures thereof, or mixtures of these and water. Glycols and glycol ethers can also be added as solvents, plasticizers or diluents.

A two-part binder/aggregate system is prepared according to the present invention wherein one part contains the methylolated phenolic compound, the novolac resin, and the alkalizing agent, and wherein the second part contains the ester-functional curing agent. Oxides or hydroxides of calcium and/or magnesium and mixtures thereof may also be present as part of the aggregate mix. Preferred levels of oxides or hydroxides of calcium and magnesium are about 0.5 to 2.0% of the total aggregate weight. Other combinations of the aforedescribed components to form a two part system will be obvious to those skilled in the art.

The amount of hexa, formaldehyde, paraformaldehyde or other methylene-generator, if used in the binder, will generally vary inversely with the amount of the poly(orthomethylolated) phenolic compound in the resin binder since the combination of poly(orthomethylolated) phenolic compound and novolac is curable at ambient temperature in the presence of an ester-functional curing agent without hexa or formaldehyde due to the methylol functionality. Hexa, if used, is preferably added to resin binder formulations with lower alkali levels since higher alkalinity reduces the effectiveness of hexa. However, use of hexa is optional.

In addition, the combination of a poly(orthomethylolated) phenolic compound and a novolac is curable at elevated temperatures without hexa or curing agent.

The curing agents useful in this invention are those chemicals known in the art as having at least one ester-functional group which is capable of catalyzing the cure of resole resins at ambient conditions. The ester-functional curing agent cures at ambient conditions the low viscosity resin binders of the present invention to thereby provide "green strengths" previously unavailable to novolac-aggregate systems. The ester-functional curing agent may be selected from the group consisting of lactones, cyclic organic carbonates, carboxylic acid esters, and the like, and mixtures thereof. Generally, when ambient temperature green strength is desired, it is preferred to use a curing agent having from 3 to 12 carbon atoms and more preferably from 4 to 10 carbon atoms. Gaseous or vaporous esters, such as $C_1$–$C_3$ alkyl formates, are also acceptable curing agents.

The use of a gaseous ester to cure resole resins is taught in U.S. Pat. No. 4,468,359, now reissued as U.S.

Pat. Re. No. 32,720, which is incorporated herein by reference.

Examples of lactones which accelerate the room temperature cure or hardening of the resin binders of the compositions of the present invention include, but are not limited to, gamma-butyrolactone, valerolactone, caprolactone, beta-propiolactone, beta-butyrolactone, beta-isobutyrolactone, beta-isopentylactone, gamma-isopentylactone, delta-pentylactone, and epsilon-caprolactone.

Examples of organic carbonates which accelerate the cure of the resin binders of the compositions of the present invention include, but are not limited to, propylene carbonate, ethylene carbonate, glycerol carbonate, 1,2-butylene carbonate, 1,3-butylene carbonate, 1,2-pentylene carbonate and 1,3-pentylene carbonate. Other esters of short and medium chain (e.g., one carbon to six carbon) alkyl monohydric or polyhydric alcohols, and short or medium chain carboxylic acids (e.g., carboxylic acids having one to six atoms) may be used.

Carboxylic acid esters which accelerate the cure of the resin binders include, but are not limited to, methyl acetate, ethylene glycol diacetate, glycerol diacetate (diacetin), and glycerol triacetate (triacetin). In the case where a carboxylic acid ester is used, triacetin is preferred.

Other aliphatic monoesters may be suitable, such as formates, propionates, butyrates or pentanoates, and the like. Aliphatic multiesters which may be suitable include diformate, diacetate, or higher diesters of ethylene glycol, diethylene glycol, propylene glycol, 1,3-butylene glycol, glycerol, 1,3-propandediol, 1,2-butanediol, and 1,4-butanediol. Furthermore, diesters of dicarboxylic acids, such as dimethyl malonate, dimethyl glutarate, dimethyl adipate, and dimethyl succinate, are suitable.

Lower alkyl formates, gamma-butyrolactone, and propylene carbonate may be used, when rapid mixing, shaping, or curing is desired.

Also suitable as ester-functional curing agents in the present invention are aromatic esters such as the formates, acetates, and diacetates of the following: phenol, o-cresol, m-cresol, p-cresol and their mixtures, all isomers of xylenol, m-ethyl phenol, resorcinol, catechol, hydroquinone, pyrogallol, phloroglucinol, chlorophenol, o-hydroxy diphenyl, p-hydroxy diphenyl, diphenylol methane, diphenylol propane, as taught in U.K. Pat. Application Ser. No. GB 2140017A.

The ester-functional curing agent preferably is present in an amount sufficient to effect curing of the resin binder of the present compositions. This amount typically is from about 3% to about 25% by weight, based on the total solids weight in the resin binder, and preferably about 10% to 20%. Curing conditions for the room temperature cure of the resin binder are preferably ambient temperature, i.e., at least about 20° C. (68° F.), and preferably at least about 25° C. (77° F.), for example, 68° F. to 95° F. The heat applied, which facilitates the further thermal cure or hardening of the resin binders after the room temperature curing, can be heat from an oven or heat from, for example, molten material poured into or onto a mold or article prepared from the resin binder and an aggregate. The heat can also produce carbonization of the resin binder. Therefore, by "cure" herein is meant both the ambient temperature ester catalyzed crosslinking of the methylolated phenolic compound and the novolac resin to form a cured binder and also the subsequent heat and/or hexa-accelerated further cure or hardening of said binder.

The composition produced by combining the resin binder, aggregate, and ester-functional curing agent may additionally comprise any of a number of optional modifiers or additives including non-reactive solvents, silanes, hexa, graphite, metal powders, metal oxide powders, clays, iron oxide, or urea. In foundry applications and sand-binder overlays, or where silica sand is used as the aggregate, a preferred additive is a silane adhesion promoter, such as gamma-aminopropyl triethoxysilane, which is used in amounts of, for example, up to 0.05% to 0.5% by weight, based on the total resin binder. In refractory applications, clays, metal powders (e.g. aluminum, magnesium or silicon), and graphite are preferred additives.

The Overlay Coating

The invention is, in another aspect, an overlay coating applied to a rigid surface such as concrete. Thus a room temperature curable flooring composition is provided comprising a resin binder and aggregate system prepared as described above. Aggregates for the overlay coating can be selected from low or high density materials or mixtures thereof. Low density aggregates useful herein can include pumice, perlite and vermiculite, while high density aggregates are preferably limestone, quartz, sand, gravel, crushed rock, broken brick and air-cooled blast furnace slag.

Impregnated Paper

In yet another aspect, the present invention provides an impregnated paper or fabric, wherein a paper, paperboard, fiber, woven or non-woven material is impregnated with the aforedescribed curable resin binder system or the aforedescribed binder/aggregate mixture and the binder then cured. The impregnated paper or fabric can be optimally pressed without a liquid ester and may be further treated with a gaseous ester curing agent, by gassing the impregnated paper or fabric with a $C_1$-$C_3$ alkyl formate. Subsequent exposure of the coated substrate to elevated temperatures may be beneficial but is not essential.

The Shaped Article

The invention is, in a further aspect, a shaped article comprising an aforedescribed aggregate material bonded together with the aforedescribed resin binder and curing agents.

Accordingly, shaped articles which may be prepared include, for example, foundry shapes (e.g. foundry molds and cores), refractory articles (e.g., refractory bricks, kiln furniture, hot tops, tundish liners, insulation, and ceramic materials), and the like.

Process for Preparing a Shaped Article

In yet other aspects, the invention relates to a process for preparing a shaped article. In one aspect, the invention relates to a process for making a refractory body that can be pyrolyzed or sintered, and in another aspect, to a process for making foundry shapes such as molds and cores.

Mixing the aforedescribed aggregate material, poly(orthomethylolated) phenolic compound, novolac resin and ester-functional curing agent may be accomplished by any means known in the art, i.e., using any industrial mixer such as an Eirich mixer, a Simpson mixer, a Muller mixer, Mortar mixer and the like. Because of the lower viscosity of the resin binder due to the methylolated phenolic compound present, the resulting mixture is more fluid at 25° C. than are binder systems using higher viscosity resins.

The free flowing binder-aggregate mixture which results from the previous step may be molded by any technique known in the art and subjected to pressure to form a desired shape. For example, the binder-aggregate may be subjected to compression molding, or transfer molding, or isostatic pressing, or extrusion or injection molding at desired temperatures and pressures. Monolithic shapes can be created by vibrating the binder-aggregate mixture into a mold and overlay floorings can be troweled.

Following shaping, for refractory applications the shape may be subjected to a series of heat treatment techniques as known in the art. A typical heat treatment involves a continual increase in temperature up to about 260° F. (127° C.) to 400° F. (205° C.) to effect thermal cure of the resin binder. Further heat treatment up to 800° C. to 1000° C. promotes carbonization of the resin binder.

As in conventional foundry practice, the free flowing binder-aggregate mixture of the present invention can be charged into a foundry corebox or pattern mold by any method known in the art, such as is disclosed in Quist, et al., U.S. Pat. No. 4,426,467, to Quist, et al., herein incorporated by reference. For example, immediately after preparation, the binder-aggregate mixture may be discharged into a corebox or pattern mold and allowed to stand at ambient temperature for a period of time dependent upon, among other things, the curing agent used in the binder. Gaseous ester-functional curing agents may also be introduced to the corebox or pattern mold at this time. If gaseous ester-functional curing agents are to be used, liquid ester-functional curing agents can be deleted from the resin binder. Generally, the ambient temperature cure time for curing the compositions with gaseous ester-functional curing agents will be between about 10 seconds and about 30 seconds.

The resultant shaped article is then suitable for use in foundry molding and is resistant to veining and tearing often experienced by foundry articles.

The invention is illustrated by the following Examples which are intended merely for the purpose of illustration and are not to be regarded as limiting the scope of the invention or the manner in which it may be practiced. Unless specifically indicated otherwise, parts and percentages are given by weight.

EXAMPLE 1

PREPARATION OF NOVOLAC RESIN

A reactor was charged with 981 grams (10.44 moles) phenol at 40° C. and 2.0 grams of 93% sulfuric acid and heated to 77° C. To the mixture was added 467 grams (7.783 moles) of 50% aqueous formaldehyde over 60 minutes. The reaction mixture was refluxed for 30 minutes and then distilled at atmospheric pressure to a temperature of 110° C. The residue was neutralized with a small amount of lime water slurry and the mixture distilled at atmospheric pressure to 149° C. Vacuum distillation was commenced down to 24 inches Hg at 149° C. over a 20 minute period. The resulting novolac resin product contained 6% free phenol, exhibited a drop melt point of 248° F. (120° C.) and an initial formaldehyde:phenol mole ratio of 0.746:1.

To a 1 gallon Hobart mixer, charged with about 1.0 Kg. of magnesia at 25 to 26° C. (75 to 77° F.) was added 70.9 grams of a 50% aqueous resin solution of the above novolac resin and DMPC to produce a mixture containing 3% phenolic resin solids based on the weight of the magnesia aggregate. The aqueous resin solution was prepared from 30.5 grams of the above novolac resin, 22.0 grams of 45% aqueous potassium hydroxide, 29.9 grams of water, and 7.6 grams of DMPC. The magnesia was of −14 to +48 mesh size. The binder-aggregate mixture was mixed for 2 minutes, followed by the addition to the mixture of 17% triacetin (12.1 grams) curing agent. Mixing was continued for one minute. A 150 gram sample of the mix was charged to a dogbone die which was then subjected to a ramming pressure of 15 tons for 1 minute to produce a tensile strength test specimen. The specimens, 3 inches long, 1 inch thick and 1 inch wide at the neck, were allowed to stand 24 hours at 25° C. and 42% to 48% relative humidity prior to being subjected to breaking on a Tinius Olsen tensile test machine. Some dogbone specimens after the 24 hours at 25° C. were subjected to a 40 hour temperature cycling, which includes 10 hours warming to 98° C., 18 hours at 98° C., and then 12 hours at 177° C. Tensile strengths of these oven-cured samples were also obtained, and recorded as P.O.C. (post oven cure). Compression tests were also performed on the dogbone specimens after the tensile tests. In this test, the dogbone pieces were machined to approximately 1.44 inches in length for a total surface area of approximately 1.95 square inches, and a thickness of ½inch. Pounds of pressure to failure after 1000° C. firing under nitrogen for one hour were recorded. The room temperature tensile strengths after 24 hours at room temperature and after oven curing, and the compressive failure test results for various compositions are shown in Table I.

EXAMPLE 2

Preparation of Resole Resin

A reactor was charged with phenol (940 grams, 10.0 moles) and aqueous 45% solution of potassium hydroxide (62.2 grams, 0.50 moles). This solution was warmed to 60° C. and to the warm solution with stirring was added, over a 30 minute period, a 50% aqueous formaldehyde solution (1074 grams, 17.9 moles), during which time the temperature rose to 105° C. The reaction mixture was then cooled to 75 -85° C. and held at that temperature until a Gardner viscosity (25° C.) of T-U was reached. The solution was then cooled to room temperature and 692 grams of the solution was diluted with 74 grams water and 120 grams of 45% aqueous potassium hydroxide was added with mixing. The resulting potassium:phenol mole ratio was 0.34:1 and the initial formaldehyde:phenol mole ratio charged to the reactor was 1.79:1. Lower and higher potassium:phenol mole ratios were prepared in a similar manner by adjusting the amounts of water and potassium hydroxide utilized.

EXAMPLE 3

Preparation of Novolac Resin OX-31

A reactor was charged with phenol (1000g, 10.64 moles) and oxalic acid dihydrate (3.6 g., 0.0286 moles). This solution was heated to 100° C. and 50% aqueous formaldehyde (514 g., 8.57 moles) added over 1 hour. The reaction was refluxed for 3 hours and then distilled atmospherically as rapidly as possible to 149° C. The distillation was continued under 26 inches Hg to 182° C. and held for 10 minutes. The resulting novolac resin product contained 3% free phenol, exhibited a drop melt point of 297° F. (147° C.) and had an initial molar ratio charged to the reactor of formaldehyde to phenol of 0.805:1.

EXAMPLE 4

Preparation of Impregnated Paper

A solution for impregnating paper was prepared as follows: 13.9 grams of a 65% by weight solution in methanol of novolac (prepared by the method of Example 1) was mixed with 7.3 grams of a 62% solids solution of trimethylol phenol which had a formaldehyde to phenol molar ratio of 2.87:1 and a potassium to phenol molar ratio of 0.5:1. The solution was diluted with 3.4 grams of 45% aqueous potassium hydroxide and 125.5 grams of methanol. A sheet of 5 ½ by 8 inch Autolube filter paper was immersed for 5 seconds in the above solution and immediately blotted between 4 sheets of absorbent paper. The impregnated paper was then partially dried by heating at 300° F. for 1 ½ minutes in a circulating air oven. The dried impregnated paper was then cured by exposure to methyl formate vapor at 90° F. for 10 minutes. Dry and wet Mullen burst strengths were determined and are presented in Table V. The results show the resin impregnated paper is significantly stronger than the non-impregnated paper.

In the Tables, all mixtures contained 3% resin solids used as an aqueous, 50% solution. The samples were prepared according 25 to the methods of Examples 1–3. The ester-functional curing agent in all cases was triacetin. Tensile strength measurements are an average of three samples. Densities of the specimens after 24 hours at room temperature for magnesia aggregate systems were 2.81±0.02 gm/cc and after post oven-cure were 2.78±0.02 gm/cc. Corresponding densities for sand aggregate mixtures were 1.78±0.01 gm/cc room temperature and 1.76±0.02 gm/cc for post oven cure.

Trials 1, 2 and 3 on Table I are comparative examples using a resole resin prepared by the method of Example 2, above. No low molecular weight poly(orthomethylolated) phenolic compound or novolac resin was used therein. For comparative trial 3 of Table I, the resole resin and the novolac resin OX-31, prepared by the method of Example 3, above, were combined on a 1:2 weight ratio.

Trials 4–19 combine novolac resin prepared as in Example 1, above, with various low molecular weight phenolic compounds. The results of the tensile and compression strength tests indicate that acceptable room temperature (R.T.) strengths and post oven cure (P.O.C.) strengths are obtained by the present invention.

TABLE I

| | BONDING OF MAGNESIA AGGREGATE[a] | | | | | |
|---|---|---|---|---|---|---|
| Resin Mix | $K^+$/Phenol Mole Ratio | % Triacetin | Tensile Strength, psi | | | Compression Strength[c] |
| | | | 24 Hrs. RT | P.O.C.[b] | 200° C.[h] | |
| 1. Resole (alone)[d] | 0.34:1 | 8 | 335 | 1474 | 987 | 630 |
| 2. Resole (alone) | 0.34:1 | 17 | 386 | 1083 | 928 | 630 |
| 3. Resole: OX-31[e] 1:2 | 0.18:1 | 17 | 197 | 1493 | 1022 | |
| 4. Novolac[f]: DMPC 5:1 hexa[g] | 0.21:1 | 3.6 | 163 | 1600 | 1094 | 1000 |
| 5. Novolac + hexa[g] | 0.21:1 | 3.6 | 47 | 1612 | 1217 | |
| 6. Resole (alone)[d] | 0.63:1 | 17 | 705 | 825 | | |
| 7. Novolac: DMPC 4:1 | 0.62:1 | 17 | 149 | 887 | | |
| 8. Novolac: DMPC 4:1 | 0.31:1 | 17 | 39 | 1060 | | |
| 9. Novolac: DMPC 4:1 hexa[g] | 0.31:1 | 17 | 135 | 1335 | | |
| 10. Novolac: DMPC 9:1 | 0.55:1 | 17 | 73 | 767 | | |
| 11. Novolac: DMPC 7:3 | 0.71:1 | 17 | 195 | 1123 | | |
| 12. Novolac: TMBPA 4:1 | 0.62:1 | 17 | 268 | 874 | | |
| 13. Novolac: TMP 4:1 | 0.62:1 | 17 | 138 | 1086 | | 3183 |
| 14. Novolac: TMBPA 4:1 | 0.62:1 | 17 | 245 | 1035 | | 2600 |
| 15. Novolac: TMBPA 4:1 | 0.62:1 | 17 | 212 | 1337 | | 2625 |

TABLE I-continued

| | | | BONDING OF MAGNESIA AGGREGATE[a] | | | |
|---|---|---|---|---|---|---|
| Resin Mix | K+/Phenol Mole Ratio | % Tri-acetin | Tensile Strength, psi | | | Compression Strength[c] |
| | | | 24 Hrs. RT | P.O.C.[b] | 200° C.[h] | |
| hexa[g] | | | | | | |
| 16. Novolac: DMPC 4:1 | 0.62:1 | 17 | 127 | 881 | | 4138 |
| 17. Novolac: o-HBA 4:1 | 0.62:1 | 17 | 6 | 633 | | 2242 |
| 18. Novolac: p-HBA 4:1 | 0.62:1 | 17 | 6 | 599 | | 2313 |
| 19. Novolac: DMPC 4:1 | 0.62:1 (0.57 as Li+) | 17 | 17 | 1164 | | 4285 |

[a]The magnesia was −14 to +48 mesh size; present at 95% by weight of the composition.
[b]"P.O.C." means post-oven cure, wherein the sample is heated to 98° C., held for 18 hours, then heated to 177° C. for 12 hours.
[c]Pounds compression to failure after 1000° C. firing under nitrogen for one hour.
[d]"Resole" is a phenol-formaldehyde resin prepared by the method of Example 2 with a formaldehyde to phenol ratio of 1.79:1.
[e]OX-31 is a novolac resin prepared by the method of Example 3 with a formaldehyde to phenol ratio of 0.805:1.
[f]The is a novolac resin was prepared by the method of Example 1, and is used in Examples 4, 5, and 7–19.
[g]Hexa added at 10% by weight based on weight of novolac.
[h]Samples were tested hot (200° C.) for tensile strength after the POC treatment and 1 hour at 200° C.

TABLE II

| | BONDING OF SAND AGGREGATE | | | |
|---|---|---|---|---|
| Resin Mix | K+/Phenol Mole Ratio | % Tri-acetin | Tensile Strength, psi | |
| | | | 24 Hrs. RT | P.O.C.[b] |
| 19. Resole (alone)[d] | 0.63:1 | 17 | 55 | 78 |
| 20. Resole[d]: OX-31[e] 1:1 | 0.57:1 | 17 | 0 | 605 |
| 21. Novolac[f]: DMPC 4:1 | 0.62:1 | 17 | 0 | 267 |

[b]"P.O.C." means post-oven cure, wherein the sample is heated to 98° C., held for 18 hours, then heated to 177° C. for 12 hours.
[d]"Resole" is a phenol-formaldehyde resin prepared by the method of Example 2 with a formaldehyde to phenol ratio of 1.79:1.
[e]OX-31 is a novolac resin prepared by the method of Example 3.
[f]Novolac is a resin prepared by the method of Example 1.

Table III indicates tensile strengths after 24 hour room temperature aging and 40 hour post oven cure cycle of compositions comprising magnesia aggregate containing 10% by weight graphite. The resin mixes were prepared as in earlier examples with 17% by weight triacetin as the ester-functional curing agent. The resin mixes were added to the magnesia/graphite aggregate in an amount equal to 3% phenolic solids by weight of the magnesia.

TABLE III

| | BONDING OF MAGNESIA AGGREGATE CONTAINING 10% GRAPHITE | | |
|---|---|---|---|
| Resin Mix | K+/Phenol Mole Ratio | Tensile Strength, psi | |
| | | 24 Hrs. RT | 40 Hrs. P.O.C. |
| 22. Resole[a] | 0.63:1 | 593 | 849 |
| 23. Novolac[b]: TMBPA 4:1 | 0.63:1 | 295 | 903 |
| 24. OX-31[c]: Resole 1:1 | 0.63:1 | 594 | 1015 |

[a]"Resole" is a phenol-formaldehyde resin prepared by the method of Example 2 with a formaldehyde to phenol ratio of 1.79:1.
[b]Novolac is a resin prepared by the method of Example 1.
[c]OX-31 is a novolac resin prepared by the method of Example 3.

Table IV presents comparative examples 25, 26, 27 which do not use low molecular weight poly(orthomethylolated) phenolic compounds and Example 28, which uses TMBPA and a novolac resin. An important feature of the present invention is the low viscosity of Example 28 maintained after six weeks relative to resole alone (Example 26) and resole/novolac resin mixture (Example 27).

TABLE IV

| | VISCOSITY STABILITIES OF RESIN BINDER SOLUTIONS, 50% AQUEOUS | | | | |
|---|---|---|---|---|---|
| Resin Mix | K+/Phenol[a] Mole Ratio | Viscosity, Centipoise at 25° C. | | | |
| | | Initial | 2 Weeks | 4 Weeks | 6 Weeks |
| 25. Resole[b] | 0.63:1 | 250 | 320 | 470–500 | 627 |
| 26. Resole[b] | 0.34:1 | 590 | 1700 | 5490 | >14,800 |
| 27. Novolac[c]: Resole 1:1 | 0.28:1 | 1990 | 6340 | >14,800 | >14,800 |
| 28. Novolac[c]: TMBPA 4:1 | 0.62:1 | 627 | 627 | 884 | 1,070 |

[a]The K/P ratio is the ratio of molar equivalents of potassium ion to phenol functionality present in the binder composition.
[b]The resole is a resin prepared by the method of Example 2 with a formaldehyde to phenol ratio of 1.79:1.
[c]Novolac is a resin prepared by the method of Example 1.

TABLE V

MULLEN TESTING OF IMPREGNATED FILTER PAPER

| Resin pick up | Dry Mullen, psi | Boiled Mullen, psi |
| --- | --- | --- |
| 1. None (untreated paper) | 9.5 | 4.4 |
| 2. 17.8% (no gas cure) | 18.3 | 4.5 |
| 3. 17.8% (with gas cure) | 30.9 | 13.4 |

What is claimed is:

1. A composition of at least three different components comprising:
   (a) a poly(orthomethylolated) phenolic compound, wherein the molecular weight of the poly(orthomethylolated) phenolic compound is less than about 320, and wherein the poly(orthomethylolated) phenolic compound has at least two methylol groups that are in positions ortho to a hydroxyl group of the phenolic compound;
   (b) a phenol-formaldehyde novolac resin; and
   (c) an alkalizing agent capable of supplying alkali ions to the composition, wherein the molar ratio of alkali, calculated as equivalents of potassium ion, to phenol group in the composition is in the range of from about 0.1:1 to about 0.7:1, and wherein the alkalizing agent is selected from the group consisting of potassium hydroxide, sodium hydroxide, calcium hydroxide, calcium oxide, lithium hydroxide, lithium oxide and a mixture thereof.

2. A composition as claimed in claim 1 further comprising water, wherein the Gardner viscosity of the composition at 25° C. is less than 6000 centipoise.

3. A composition as claimed in claim 1 further comprising an ester-functional curing agent, wherein the ester-functional curing agent is present in the composition in an amount of from about 3% to about 25% based on the solids weight of said three components whereby the composition is curable at ambient conditions.

4. A composition as claimed in claim 1 further comprising a particulate aggregate material.

5. A composition as claimed in claim 1 wherein the weight ratio of poly(orthomethylolated) phenolic compound to phenol-formaldehyde novolac resin is from about 1:5 to about 1:2 on a dry solids basis.

6. A composition as claimed in claim 3 wherein the ester-functional curing agent is selected from the group consisting of lactones, cyclic organic carbonates, and carboxylic acid esters, and mixtures thereof.

7. A composition as claimed in claim 4 wherein the aggregate material is selected from the group consisting of, quartz, zircon sand, pumice, vermiculite, perlite, olivine sand, magnesia, magnesium hydroxide, magnesium oxide, calcium oxide, calcium hydroxide, zirconia, silicon carbide silicon nitride, boron nitride, gravel, bauxite, chromite sand, broken brick, corundum, alumina, air-cooled blast furnace slag, silica, and mixtures thereof, wherein the particulate aggregate material is present in an amount of from about .85% by weight to about 98% by weight of the composition.

8. A composition as claimed in claim 1 further comprising an additive selected from the group consisting of graphite, silicon dioxide, clay, silanes, iron oxide, urea, aluminum powder, magnesium powder, silicon powder, and non-reactive solvents, wherein the additive is present in a total amount up to about 20% by weight based on the weight of the composition.

9. A composition as claimed in claim 1 further comprising a methylene generator selected from the group consisting of formaldehyde, paraformaldehyde, and hexamethylenetetramine.

10. A composition as claimed in claim 3 wherein said ester-functional curing agent is selected from the group consisting of triacetin, butyrolactone, caprolactone, and propylene carbonate.

11. A composition as claimed in claim 3 wherein the ester-functional curing agent is in a gaseous or vapor form.

12. A composition as claimed in claim 1 wherein the novolac resin has a formldehyde:phenol mole ratio in the range of about 0.5:1 to about 1:1.

13. A composition as claimed in claim 1 wherein the poly(orthomethylolated) phenolic compound is selected from the group consisting of bis-ortho(methylol 1,5-dihydroxynaphthalene); bis-ortho(methylol 1,6-dihydroxynaphthalene; bis-ortho(methylol 2,7-dihydroxynaphthalene); 2,6-dimethylol phenol; 2,4,6-trimethylol phenol; 2,6-dimethylol-p-cresol; 2,6-dimethylol-p-tertiary butylphenol; 2,6-dimethylol-p-phenylphenol; 6,6'-dimethylol 2,2'-biphenol; 4,4',6,6'-tetramethylol 2,2'-biphenol; 2,2'-dimethylol 4,4'-biphenol; 2,2', 6,6'-tetramethylol 4,4'-methylene diphenol; 6,6'-dimethylol 2,2'-methylene diphenol; 4,6,6'-trimethylol 2,2'-methylene diphenol; 4,4', 6,6'-tetramethylol 2,2'-methylene diphenol; 2,2'-dimethylol bisphenol A; 2,2',6-trimethylol bisphenol A; 2,2', 6,6'-tetramethylol bisphenol A; alkyl, alkoxy, alkaryl, aryl derivatives thereof; and mixtures thereof.

14. A composition as claimed in claim 13 further comprising:
   (a) said alkalizing agent present in an amount sufficient to produce a mole ratio of alkali to phenol in the composition of from about 0.1:1 to about 0.7:1;
   (b) a solvent selected from the group consisting of water, $C_1$–$C_7$ aliphatic and aromatic alcohols, and $C_2$–$C_4$ glycols, and mixtures thereof;
   (c) an ester-functional curing agent selected from the group consisting of lactones, cyclic organic carbonates, carboxylic acid esters, and mixtures thereof; and
   (d) a particulate aggregate material selected from the group consisting of quartz, pumice, vermiculite, perlite, zircon sand, olivine sand, magnesia, magnesium hydroxide, magnesium oxide, calcium oxide, calcium hydroxide, zirconia, silicon carbide, silicon nitride, boron nitride, gravel, bauxite, chromite sand, broken brick, corundum, alumina, air-cooled blast furnace slag, silica, and mixtures thereof.

15. A composition as claimed in claim 14 wherein the poly(orthomethylolated) phenolic compound is 2,6-dimethylol-p-cresol, and wherein the alkalizing agent is potassium hydroxide and is present in an amount sufficient to catalyze crosslinking between the poly(orthomethylolated) phenolic compound and the novolac resin.

16. A composition as claimed in claim 14 wherein the particulate aggregate material is magnesia, which aggregate is present at about 70 to 97 weight percent of the composition, and wherein the ester-functional curing agent is triacetin.

17. A composition as claimed in claim 14 wherein the poly(orthomethylolated) phenolic compound is 2,2', 6,6'-tetramethylol bisphenol A, and wherein the alkalizing agent is potassium hydroxide and is present in an amount sufficient to catalyze crosslinking of the phenolic compound and the novolac resin.

18. A composition as claimed in claim 14 wherein the particulate aggregate material is alumina which is present at about 70 to 97 weight percent of the composition, and wherein the ester-functional curing agent is triacetin.

19. A composition as claimed in claim 14 wherein the poly(orthomethylolated) phenolic compound is 2,4,6-trimethylol phenol, and wherein the alkalizing agent is potassium hydroxide, present in an amount sufficient to catalyze crosslinking between the poly(orthomethylolated) phenolic compound and the novolac resin.

20. A composition as claimed in claim 14 wherein the particulate aggregate material is silica, which aggregate is present at about 70 to 97 weight percent of the composition.

21. A composition as claimed in claim 1 wherein the poly(orthomethylolated) phenolic compound comprises the reaction product obtained by combining a hydroxyphenyl compound and a source of formaldehyde or paraformaldehyde.

22. A shaped article comprising an aggregate material bonded together by a resin binder, said resin binder in its uncured state comprising (i) a phenol-formaldehyde novolac resin having a formaldehyde:phenol mole ratio in the range of about 0.5:1 to about 1:1; (ii)- a poly(orthomethylolated) phenolic compound having a molecular weight of less than about 320 and having at least two methylol groups in positions ortho to a hydroxyl group of the phenolic compound; and (iii) an alkalizing agent selected from the group consisting of potassium hydroxide, sodium hydroxide, calcium hydroxide, calcium oxide, lithium oxide, lithium hydroxide and mixtures thereof, present in an amount sufficient to produce in the resin binder an alkali: phenol molar ratio of from 0.1:1 to about 0.7:1, wherein said alkali content is calculated as equivalents of potassium ion, wherein the novolac resin (i) and the poly(orthomethylolated) phenolic compound (ii) are present in a weight ratio of between about 2:1 and about 5:1 and wherein the resin binder has been cured using a curing agent selected from the group consisting of lactones, cyclic organic carbonates, 1carboxylic acid esters, $C_1$–$C_3$ alkyl formates, and mixtures thereof.

23. A process for making a refractory body that can be sintered to form a carbonized article, prepared from an aggregate material, a resin binder comprising a phenol formaldehyde novolac resin and a poly(orthomethylolated) phenolic compound and an ester-functional curing agent in an amount sufficient to effect room temperature curing of the resin binder, and an alkalizing agent present in an amount sufficient to produce in the resin binder an alkali:phenol molar ratio of from about 0.1:1 to about 0.7:1, wherein said alkali content is calculated as equivalents of potassium ion, said novolac resin having a formaldehyde:phenol ratio in the range of about 0.5:1 to about 1:1, the poly(orthomethylolated) phenolic compound having a molecular weight of less than 320 and having at least two methylol groups in positions ortho to a hydroxyl group of the phenolic compound, and the weight ratio of novolac resin to poly(orthomethylolated) phenolic compound being in the range of about 0.35:1 to about 5:1, and wherein said curing agent is selected from the group of ester-functional curing agents consisting of lactones, organic carbonates, carboxylic acid esters, and mixtures thereof, and wherein the aggregate is selected from the group consisting of magnesia, alumina, silica, quartz, zirconia, zircon sand, olivine sand, silicon carbide, silicon nitride, boron nitride, bauxite, chromite, corundum, and mixtures thereof, and wherein the alkalizing agent is selected from the group consisting of potassium hydroxide, sodium hydroxide, lithium hydroxide, calcium hydroxide, calcium oxide, lithium oxide, and mixtures thereof the process comprising the steps of:
(a) mixing said aggregate with said novolac resin and said ester-functional curing agent, and said poly(orthomethylolated) phenolic compound and said alkalizing agent to coat said aggregate material until a binder-aggregate mixture is formed;
(b) molding said binder-aggregate mixture into a desired shape; and
(c) curing the shape to make a refractory body.

24. A process as claimed in claim 23 wherein the curing in step (c) is achieved by heating the shape.

25. A process for making a refractory body that can be sintered to form a carbonized article, prepared from an aggregate material, a resin binder comprising a phenol formaldehyde novolac resin and a poly(orthomethylolated) phenolic compound, and an alkalizing agent present in an amount sufficient to produce in the resin binder an alkali:phenol molar ratio of from about 0.1:1 to about 0.7:1 wherein said alkali content is calculated as equivalents of potassium ion, said novolac resin having a formaldehyde:phenol ratio in the range of about 0.5:1 to about 1:1, the poly(orthomethylolated) phenolic compound having a molecular weight of less than 320 and having at least two methylol groups in positions ortho to a hydroxyl group of the phenolic compound, and the weight ratio of novolac resin to poly(orthomethylolated) phenolic compound being in the range of about 2:1 to about 5:1, and wherein the aggregate is selected from the group consisting of magnesia, alumina, silica, quartz, zirconia, zircon sand, olivine sand, silicon carbide, silicon nitride, boron nitride, calcium oxide, calcium hydroxide, magnesium oxide, magnesium hydroxide, bauxite, chromite, corundum, and mixtures thereof, and wherein the alkalizing agent is selected from the group consisting of potassium hydroxide, sodium hydroxide, lithium hydroxide, calcium hydroxide, calcium oxide, lithium oxide, and mixtures thereof, the process comprising the steps of:
(a) mixing said aggregate with said novolac resin and said poly(orthomethylolated) phenolic compound and said alkalizing agent to coat said aggregate material until a binder-aggregate mixture is formed;
(b) molding said binder-aggregate mixture into a desired shape; and
(c) heating the shape to make a refractory body.

26. A process as claimed in claim 25 wherein the poly(orthomethylolated) phenolic compound is a composition obtained by combining a hydroxyphenyl compound and a source of formaldehyde.

27. A refractory body comprising:
(a) an aggregate material; (b) a resin binder comprising a phenol formaldehyde novolac resin and a poly(orthomethylolated) phenolic compound; (c) an ester functional curing agent in an amount sufficient to effect room temperature curing of the resin binder; and (d) an alkalizing agent present in an amount sufficient to produce in the resin binder an alkali:phenol molar ratio of from 0.1:1 to about 0.7:1, wherein said alkali content is calculated as equivalents of potassium ion, said novolac resin having a formaldehyde:phenol ratio in the range of about 0.5:1 to about 1:1, the poly(orthomethylolated) phenolic compound having a molecular weight of less than 320 and having at least two methylol groups in positions ortho to a hydroxyl group of the phenolic compound, and the weight ratio of novolac resin to poly(orthomethylolated) phenolic compound being in the range of from about 2:1 to about 5:1, and wherein said curing agent is selected from the group of ester-functional curing agents consisting of lactones, cyclic organic carbonates, carboxylic acid esters, and mixtures thereof, and wherein the aggregate is selected from the group consisting of magnesia, alumina, silica, quartz, zirconia, zircon sand, olivine sand, calcium hydroxide, calcium oxide, magnesium oxide, magnesium hydroxide, silicon carbide, silicon nitride, boron nitride, bauxite, chromite, corundum, and mixtures thereof, and wherein the alkalizing agent is selected from the group consisting of potassium hydroxide, sodium hydroxide, lithium hydroxide, calcium hydroxide, calcium oxide, lithium oxide, and mixtures thereof.

28. A composition as in claim 1 wherein the phenol-formaldehyde novolac resin is further combined with formaldehyde or formaldehyde and phenol.

29. A composition as claimed in claim 1, wherein the weight ratio of poly(orthomethylolated) phenolic compound to phenol-formaldehyde novolac resin is from about 1:5 to about 1:0.35.

* * * * *